United States Patent [19]

Nakano et al.

[11] Patent Number: 5,646,937
[45] Date of Patent: Jul. 8, 1997

[54] CODE DIVISION MULTIPLE ACCESS COMMUNICATION SYSTEM

[75] Inventors: Takayuki Nakano, Kanazawa; Osamu Kato; Nobuo Asano, both of Yokohama, all of Japan

[73] Assignee: Matsushita Electric Industrial Co., Ltd., Osaka, Japan

[21] Appl. No.: 516,741

[22] Filed: Aug. 18, 1995

[30] Foreign Application Priority Data

Aug. 18, 1994 [JP] Japan ................. 6-193460

[51] Int. Cl.$^6$ ................................ H04J 13/04
[52] U.S. Cl. ............... 370/252; 455/67.3; 370/335
[58] Field of Search ............... 370/17, 18, 95.1, 370/95.3, 110.1, 74; 455/33.1, 33.2, 62, 63, 67.1, 67.3, 69, 70; 379/59, 60; 375/200, 205, 206

[56] References Cited

U.S. PATENT DOCUMENTS

| | | |
|---|---|---|
| 4,901,307 | 2/1990 | Gilhousen . |
| 5,047,762 | 9/1991 | Bruckert ............................ 455/63 |
| 5,056,109 | 10/1991 | Gilhousen . |
| 5,101,501 | 3/1992 | Gilhousen et al. ............... 379/60 |
| 5,166,951 | 11/1992 | Schilling . |
| 5,179,571 | 1/1993 | Schilling . |
| 5,224,120 | 6/1993 | Schilling . |
| 5,228,053 | 7/1993 | Miller et al. . |
| 5,228,056 | 7/1993 | Schilling . |
| 5,299,226 | 3/1994 | Schilling . |
| 5,327,577 | 7/1994 | Uddenfeldt ...................... 455/33.2 |
| 5,345,467 | 9/1994 | Lomp et al. . |
| 5,365,544 | 11/1994 | Schilling . |
| 5,367,533 | 11/1994 | Schilling . |
| 5,539,728 | 7/1996 | Gaiani et al. .................... 370/18 |

OTHER PUBLICATIONS

Allen Salmasi & Klein S. Gilhousen, 41st IEEE Vehicular Technology Conference, *Gateway to the Future Technology Motion*, pp. 57–62, May 19–22, 1991.

*Primary Examiner*—Douglas W. Olms
*Assistant Examiner*—Chau T. Nguyen
*Attorney, Agent, or Firm*—Ratner & Prestia

[57] ABSTRACT

A CDMA system in which carriers are segregated according to the self-sacrifice of a mobile station resulting in no communication quality deterioration due to shadowing The mobile station detects a base station which causes a sudden increase in the reception power of the mobile station, and generates self-sacrifice information and transmits the information to the base station communicating with the mobile station. The informed base station detects the self-sacrifice information transmitted from the mobile station and informs mobile communication control equipment. The mobile communication control equipment designates a carrier which is prohibited from future use and the concerned base station. The concerned base station discontinues use of the designated carrier.

11 Claims, 5 Drawing Sheets

CODE DIVISION MULTIPLE ACCESS COMMUNICATION SYSTEM

BACKGROUND OF THE INVENTION (1) Field of the Invention

The present invention relates to a code division multiple access communication system used in land mobile communications such as mobile telephones and portable telephones and in particular to a communication system using a code division multiple access communication system for utilizing a limited frequency band efficiently.

(2) Description of the Prior Art

A demand for land mobile communications such as mobile telephones and portable telephones has remarkably increased, and therefore, efficient frequency utilization techniques for keeping more subscribers in a limited frequency band are important. One of the multiple access systems for efficient frequency utilization is a code division multiple access communication system (CDMA system). A CDMA system is a multiple access system utilizing a spread spectrum communication technique which is resistant to multi-path distortion and can be expected for a diversity effect by a RAKE receiver which combines multipath components in a maximal ratio. A land mobile communication system using a CDMA system is disclosed, for example, in U.S. Pat. No. 4,901,307.

U.S. Pat. No. 4,901,307 describes a CDMA communication technique in the case in which a plurality of subscribers communicate through base stations. In a CDMA system, a system in which all base stations transmit the same pilot signal in frequency and spread code is well known. In U.S. Pat. No. 4,901,307, a pilot signal is used as a reference for initial synchronization, carrier phase offset, and carrier frequency offset at a mobile station and a reference time frame is transmitted from a base station. Propagation loss from each base station can be determined by detecting the pilot signal.

In a mobile communication system using a CDMA system, when a level of the signal from the mobile station near the base station on the reverse link from the mobile station is high, there occurs a near-far problem which causes signals from the other mobile equipment to not be received. Accordingly, it is necessary to control the transmission power of the mobile station so that the base station can receive a signal with the same level from every mobile station. Such a control method of a transmission power is described, for example, in U.S. Pat. No. 5,056,109 and 41st Vehicular Technology Conference (May, 1991 pp. 57–62).

In a mobile communication system using a CDMA system, it is possible to use the same frequency band between adjacent cells and utilize frequency resources efficiently. When the same frequency is used between adjacent cells, soft handover between cells is possible and it is possible to improve communication quality near a cell boundary. The soft hand over technique is described in U.S. Pat. No. 5,101,501.

In a typical CDMA system, however, communication quality is sometimes deteriorated by delays in the control of transmission power. In a microcell environment, propagation loss may suddenly vary due to shadowing. Communication quality deterioration occurs especially in all mobile stations communicating with an adjacent base station for a long time. To solve this problem, there is a method for maintaining the performance of the entire system by rapidly reducing the transmission power of the mobile station creating some interference and allowing only communication quality deterioration of the mobile station. But in this case, the mobile station cannot execute a soft hand over and a call drop could occur. As a result, the communication quality of the mobile station significantly deteriorates for a long time. The mobile station suddenly reducing its own transmission power is known as "self-sacrifice".

SUMMARY OF INVENTION

The present invention solves the problems of typical CDMA systems and aims to offer a CDMA system which can avoid system instability due to the influence of shadowing.

To achieve the above object, a CDMA system in accordance with an exemplary embodiment of the present invention includes a mobile station, base stations and mobile communication control equipment.

The base station includes self-sacrifice information detection means for detecting self sacrifice information from information obtained by despreading a signal provided by the mobile station and carrier determination means for determining a carrier to be used at the base station according to the information to prohibit or restrict the use of the carrier designated by the mobile communication control equipment.

The mobile station includes base station number identification means for detecting the number of the base station by despreading a pilot signal spread and transmitted from the base station, self-sacrifice information generation means for generating information indicating that the mobile station was self-sacrificed according to the base station number which was detected and the reception power and spread means for spreading a transmission data and the self-sacrifice information.

The mobile communication control equipment generates information to prohibit or restrict the use of the designated carrier at the base station according to the output of the self-sacrifice information detection means transmitted from the base station.

A CDMA system in accordance with another exemplary embodiment of the present invention also includes a mobile station, base station and a mobile communication control equipment.

The base station includes self-sacrifice information detection means for detecting self-sacrifice information from information obtained by despreading a signal provided by the mobile station and carrier determination means for determining a carrier to be used at the base station according to the information to prohibit or restrict the use of the carrier designated by the mobile communication control equipment.

The mobile station includes self-sacrifice information generation means for generating information indicating that the mobile station was self-sacrificed according to the quality of the reception data and the reception power; and spread means for spreading a transmission data and the self-sacrifice information.

The mobile communication control equipment generates information to prohibit or restrict the use of a designated carrier at the base station according to the output of the self-sacrifice information detection means transmitted from the base station, transmits information indicating which mobile station sacrificed its own communication quality to the base station and prohibits or restricts the use of the designated carrier at the communication base station.

In a CDMA system having a mobile station and a base station, a method of driving the system includes a step to reduce the power level of the transmission signal of the mobile station when the reception power at the mobile station suddenly increases, a step to detect if the pilot signal from the base station which the mobile station is now communicating with has increased or not, a step to judge that the mobile station is in a self-sacrifice state when the pilot signal does not increase and to provide the self-sacrifice information to the base station, a step to designate a carrier which is prohibited or restricted from use hereafter at the base station and a step to prohibit or restrict the use of the designated carrier by the base station which is now communicating with the mobile station.

In another CDMA system having a mobile station and a base station, a method of driving the system includes a step to reduce the power level of the transmission signal of the mobile station when the reception power at the mobile station suddenly increases, a step to detect if the reception data quality of the mobile station was improved or not, a step to judge that the mobile station is in a self-sacrifice state when the reception data quality of the mobile station was not improved and to provide the self-sacrifice information to a base station, a step to designate a carrier which is prohibited or restricted from use hereafter at the base station and a step to prohibit or restrict the use of the designated carrier by the base station which is now communicating with the mobile station.

According to the CDMA system in accordance with the present invention, it becomes possible to prevent self-sacrifice of a mobile station due to shadowing and deterioration of the communication quality can be avoided. The mobile stations communicating with the base station which do not have their transmission power controlled do not receive interference and the system works more effectively. Even when new shadowing occurs due to building and topography variations, it is possible to segregate the carriers according to these variations.

BRIEF DESCRIPTION OF THE DRAWINGS

FIG. 3b is a reception power characteristic of the mobile station in the case shown in FIG. 3a.

DETAILED DESCRIPTION OF THE INVENTION

Figure 1:
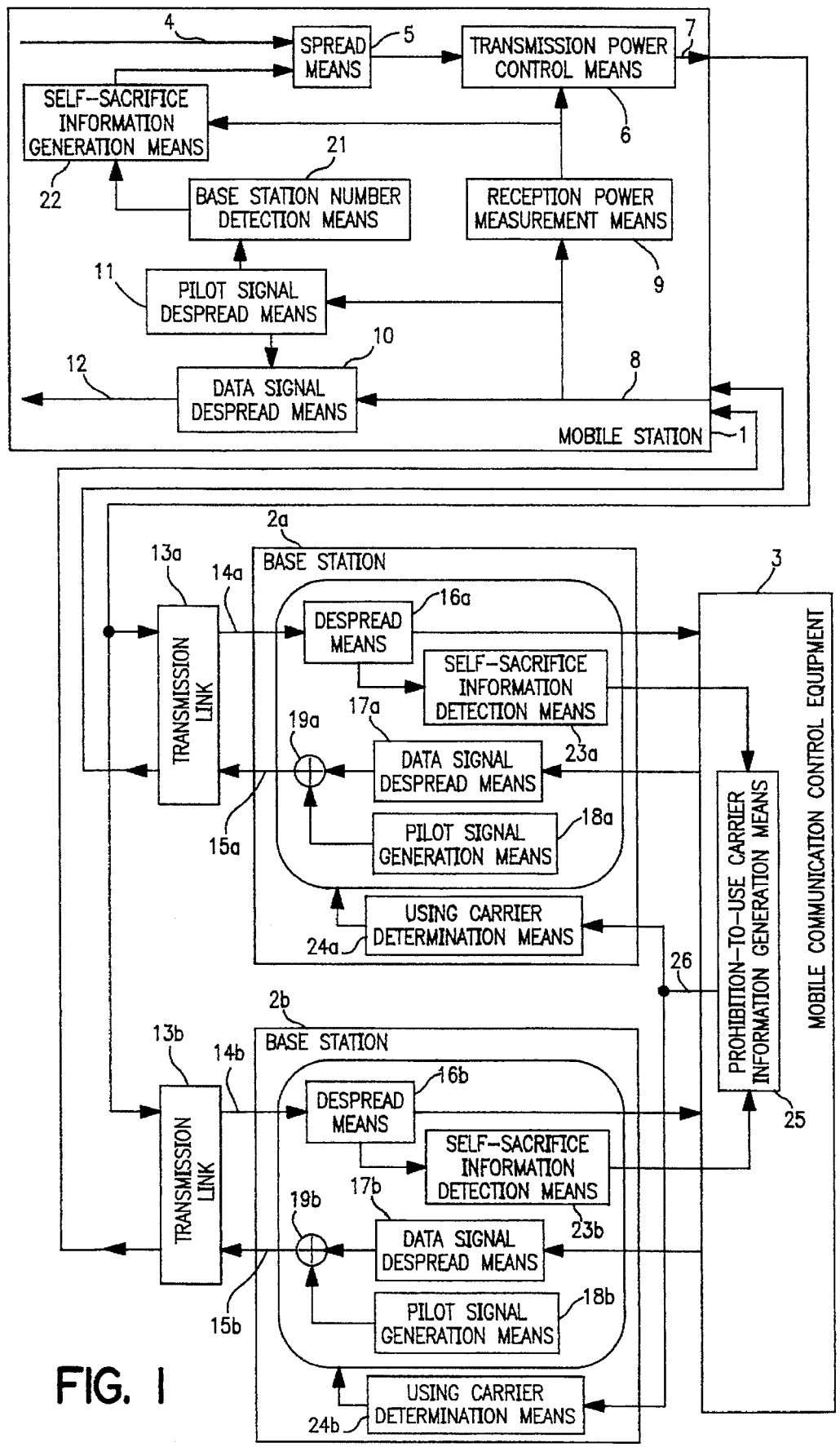
FIG. 1 is a block diagram of a mobile station, plurality of a base stations and the mobile communication control equipment used in a CDMA system in accordance with a first exemplary embodiment of the present invention.

A block diagram of a mobile station, two base stations and the mobile communication control equipment used in a CDMA system in accordance with a first exemplary embodiment of the present invention is shown in FIG. 1. The system is composed of a mobile station 1, a plurality of base stations 2a and 2b and the mobile communication control equipment 3. FIG. 1, is an example of the mobile station 1 communicating with two base stations 2a and 2b. It is understood that any number of base stations may be included in the CDMA system.

Mobile station 1 includes spread means 5, transmission power control means 6, reception power measurements means 9, data signal despread means 10, pilot signal despread means 11, base station number detection means 21 and self-sacrifice information generation means 22.

The reception power measurement means 9 measures the power of the reception signal 8 at the mobile station 1 and controls the amplification of the transmission power control means 6.

The spread means 5 spreads the transmission data 4 with a spread code allocated to the mobile station 1.

The transmission power control means 6 power-amplifies the output of the spread means 5, where the amplification is controlled by the output of the reception power measurement means 9 and outputs a mobile station transmission signal 7.

The data signal despread means 10 despreads a mobile station reception signal 8 with a spread code allocated to each data channel.

The pilot signal despread means 11 despreads with a spread code which is allocated to the mobile station reception signal 8 for each pilot channel.

The base station number detection means 21 detects power levels from base stations 2a and 2b and their identification numbers.

The self-sacrifice information generation means 22 generates self-sacrifice information.

Because base stations 2a and 2b have the same compositions, only the composition of base station 2a is described.

Base station 2a includes despread means 16a, data signal spread means 17a, pilot signal generation means 18a, adder means 19a, self-sacrifice information detection means 23a and using carrier determination means 24a.

The despread means 16a despreads a reception signal 14a which is a mobile station transmission signal 7 radiates from the mobile station 1 and received through a transmission link 13a.

The data signal spread means 17a spreads the data which is transmitted from the base station 2a to the mobile station 1.

The pilot signal generation means 18a generates pilot signals which have the same frequencies and spread codes as those of other base stations, and have different phases from that of the other base stations.

The adder means 19a adds a pilot signal coming from the pilot signal generation means 18a to the spread data coming from the data signal spread means 17a to produce a transmission signal 15a.

The self-sacrifice information detection means 23a detects self-sacrifice information transmitted from the mobile station 1.

The using carrier determination means 24a determines the carrier used at base station 2a according to prohibition-to-use carrier information 26 provided by the mobile communication control equipment 3.

The mobile communication control means 3 includes prohibition-to-use carrier information generation means 25 for generating the prohibition-to-use carrier information for base stations 2a and 2b.

Base station 2b includes a reception signal 14b, a transmission signal 15b, despread means, 16b, data signal despread means 17b, pilot signal generation means 18b, adder means 19b, self-sacrifice information detection means 23b and carrier determination means 24b.

The performance of the CDMA system described above is explained below with reference to the flow chart shown in FIG. 2 and the illustrations of the reception power variation due to shadowing of the mobile station shown in FIGS. 3a–3d.

Figure 3A:
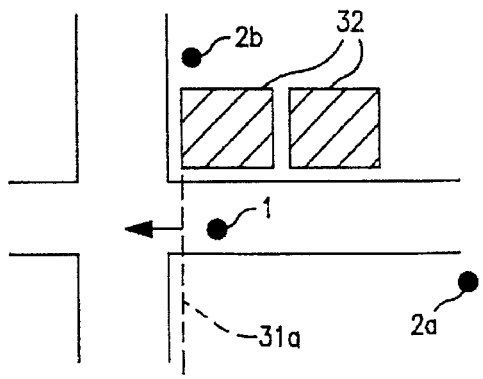
FIG. 3a illustrates a situation in which a reception power of the mobile station from one of two base stations is shadowed by an obstacle.
Figure 3B:
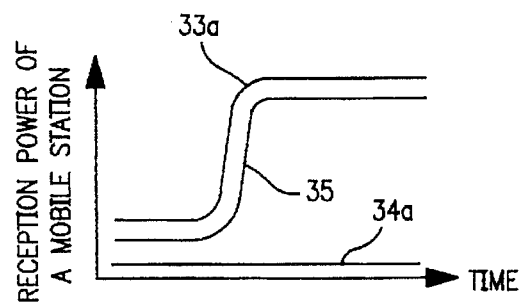
Figure 3C:
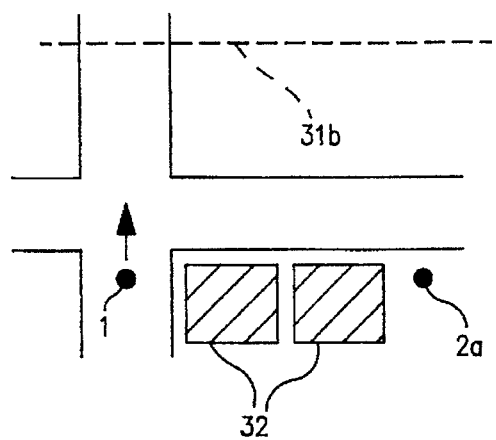
FIG. 3c illustrates a situation in which a reception power of the mobile station from one base station is shadowed.
Figure 3D:
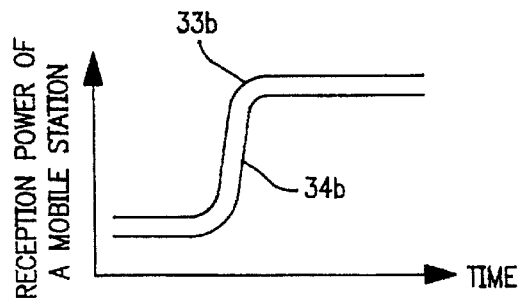
FIG. 3d is a reception power characteristic of the mobile station in the case shown in FIG. 3c.

FIG. 3a illustrates a situation in which the reception power from one of two base stations is shadowed. FIG. 3c illustrates a situation in which the reception power from one base station is shadowed. FIGS. 3b and 3d illustrate the reception power of the mobile station against time in the situations shown in FIGS. 3a and 3c respectively.

In FIG. 3a, mobile station 1 is initially in a territory of base station 2a and is in a position in which the mobile station 1 is in the shadow of an obstacle 32 with respect to base station 2b. The reception power of the mobile station 1 in this situation is small as shown by curve 34a in FIG. 3b. As soon as mobile station 1 moves beyond cell boundary 31a, however, a propagation loss from base station 2b due to the shadowing of obstacle 32 suddenly decreases and the reception power of the mobile station 1 suddenly increases as shown the right side of curve 35 in FIG. 3b. Before moving past cell boundary 31a, the mobile station 1 had an increased transmission power so that the mobile station 1 kept a sufficient quality communication with the base station 2b. After passing cell boundary 31a, the increased transmission power of the mobile station 1 deteriorates communication quality at base station 2b interfering with all of the mobile stations communicating with base station 2b. Therefore, in this case, the mobile station 1 works to avoid communication quality deterioration of the other mobile stations by suddenly lowering its own transmission power, that is, by sacrificing its own communication quality. Line 34a represents the reception power of mobile station 1 from base station 2a. Line 35 represents the reception power of mobile station 1 from base station 2b. Line 33a represents the total reception power of mobile station 1 from base stations 2a and 2b.

In the situation shown in FIG. 3c, the mobile station 1 is communicating with base station 2a. When the mobile station 1 is in the shadow of obstacle 32, the reception power of mobile station 1 is small as shown by the left side of curve 34b in FIG. 3d. When mobile station 1 moves and is out of the shadow of obstacle 32, the reception power of mobile station 1 suddenly increases as shown by the right side of curve 34b in FIG. 3d. The transmission power of the mobile station 1 is decreased suddenly so that good communication quality is maintained between the base station 2a and the mobile station 1 and self-sacrifice does not occur. Line 34b represents the reception power of mobile station 1 from base station 2a. Line 33b represents the total reception power of mobile station 1 from base stations 2a and 2b.

Thus, there are two kinds of shadowing influences that cause instability in communication systems. The first exemplary embodiment of the present invention solves these shadowing problems as follows.

Figure 2:
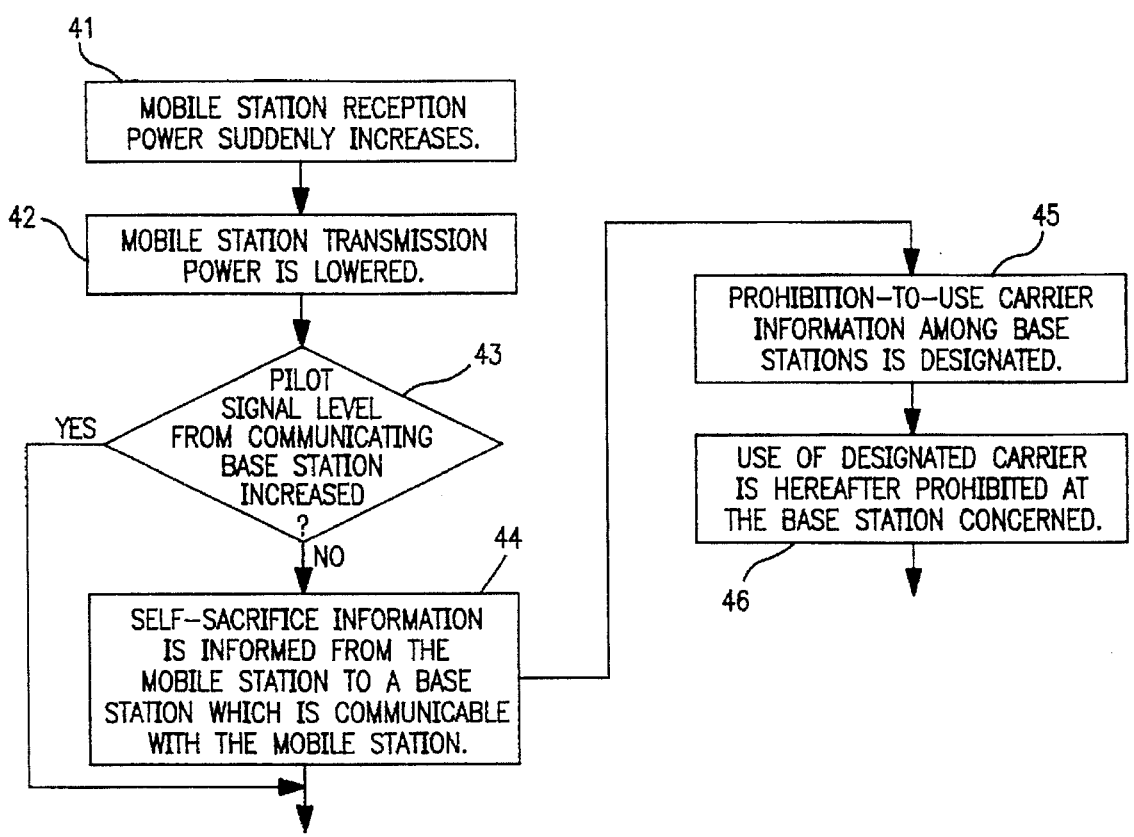
FIG. 2 is a flow chart of the performance of the system in accordance with the first exemplary embodiment of the present invention.

Referring to the flow chart shown in FIG. 2, when the reception power measurement means 9 detects that the reception power of the mobile station 1 suddenly increases (step 41), the power level of the mobile station transmission signal 7 is lowered by the transmission power control means 6 (step 42).

In the case where the reception power of the mobile station 1 suddenly increases, when the pilot signal despread means 11 detects that a pilot signal level from the communicating base station 2a does not suddenly increase (FIGS. 3a and 3b), the mobile station 1 judges that the mobile station 1 should be placed in a self-sacrifice state, detects a number to discriminate a base station at the base station number detection means 21, generates the self-sacrifice information at the self-sacrifice information generation means 22 and provides the self-sacrifice information to the communicating base station (step 43 and 44).

The self-sacrifice information includes the number of the base station which experienced interference and information indicating that self-sacrifice occurred. When the pilot signal level from the communicating base station 2a suddenly increases (FIGS. 3c and 3d), the mobile station 1 does not enter a self-sacrifice state, and the above procedure is not performed (YES in step 43).

At base stations 2a and 2b, the self-sacrifice information transmitted from mobile station 1 is detected at the self-sacrifice information detection means 23a or 23b. The detected self-sacrifice information is sent to the mobile communication control equipment 3 and a carrier which is prohibited from use hereafter and its base station are designated (step 45). Prohibition-to-use carrier information 26 is transmitted to the appropriate base stations. The carrier determination means 24a or 24b determines whether to prohibit or restrict the further use of the designated carrier (step 46). In the case of FIG. 3a, the carrier of base station 2b is presumed to be different from the carrier of base station 2a.

Exchanging the prohibition-to-use carrier information 26 between the mobile communication control equipment 3 and the base stations, prevents prohibiting the use of many carriers. Thus, it is possible to enhance the stability of the entire system by segregating the carriers according to the self-sacrifice history of the mobile station.

Figure 4:
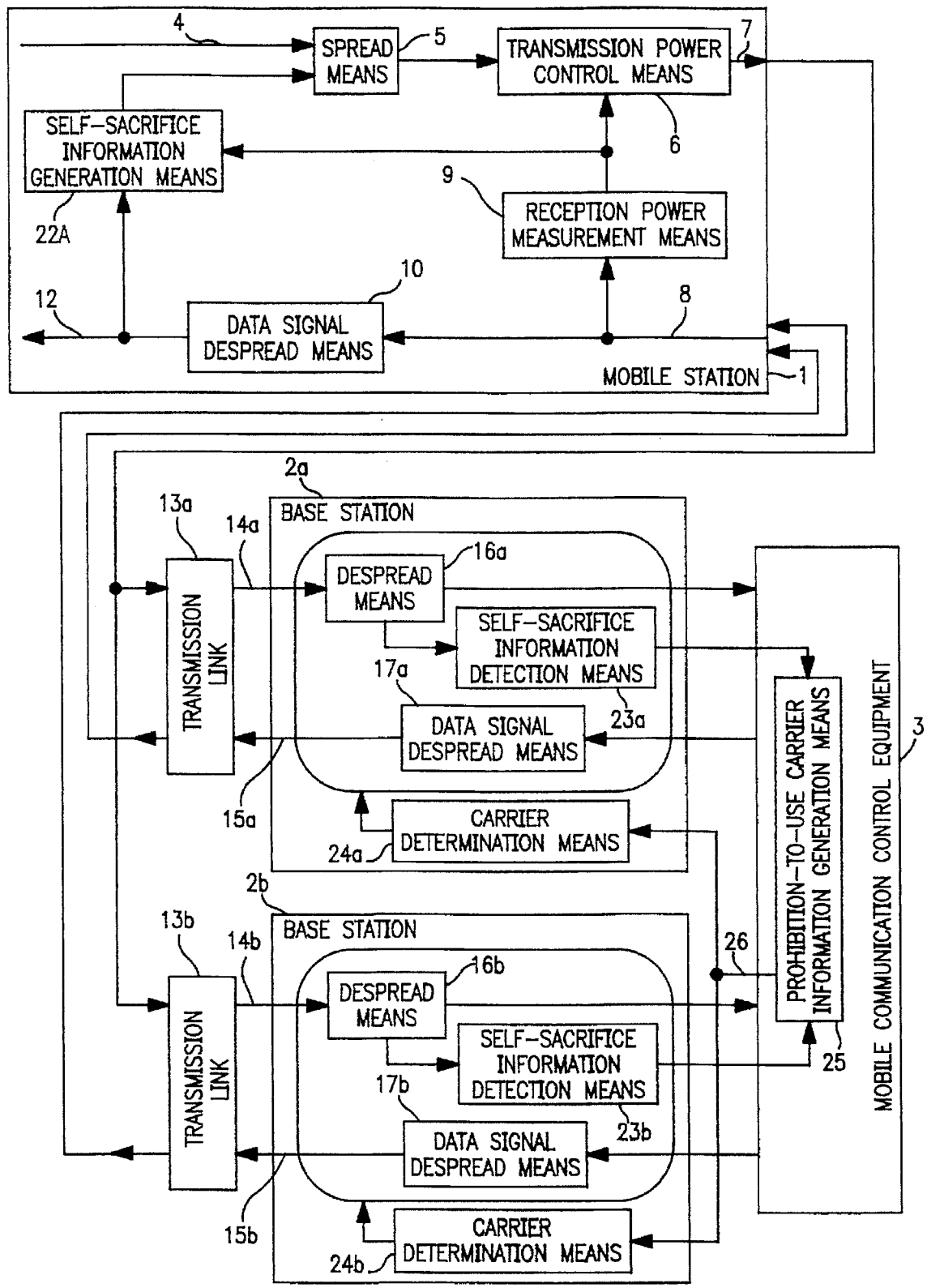
FIG. 4 is a block diagram of a mobile station, a plurality of base stations and the mobile communication control equipment used in a CDMA system in accordance with a second exemplary embodiment of the present invention.

A block diagram of a mobile station, two base stations and the mobile communication control equipment used in a CDMA system in accordance with a second exemplary embodiment of the present invention is shown in FIG. 4. The difference between the second exemplary embodiment and the first exemplary embodiment is that the pilot signal despread means 11 and the base station number detection means 21 are omitted from the mobile station 1. The reception data outputted from the data signal despread means 10 is inputted to the self-sacrifice information generation means 22A. In addition, the pilot signal generation means 18a and 18b and the adder means 19a and 19b are omitted from the base stations 2a and 2b respectively.

Figure 5:
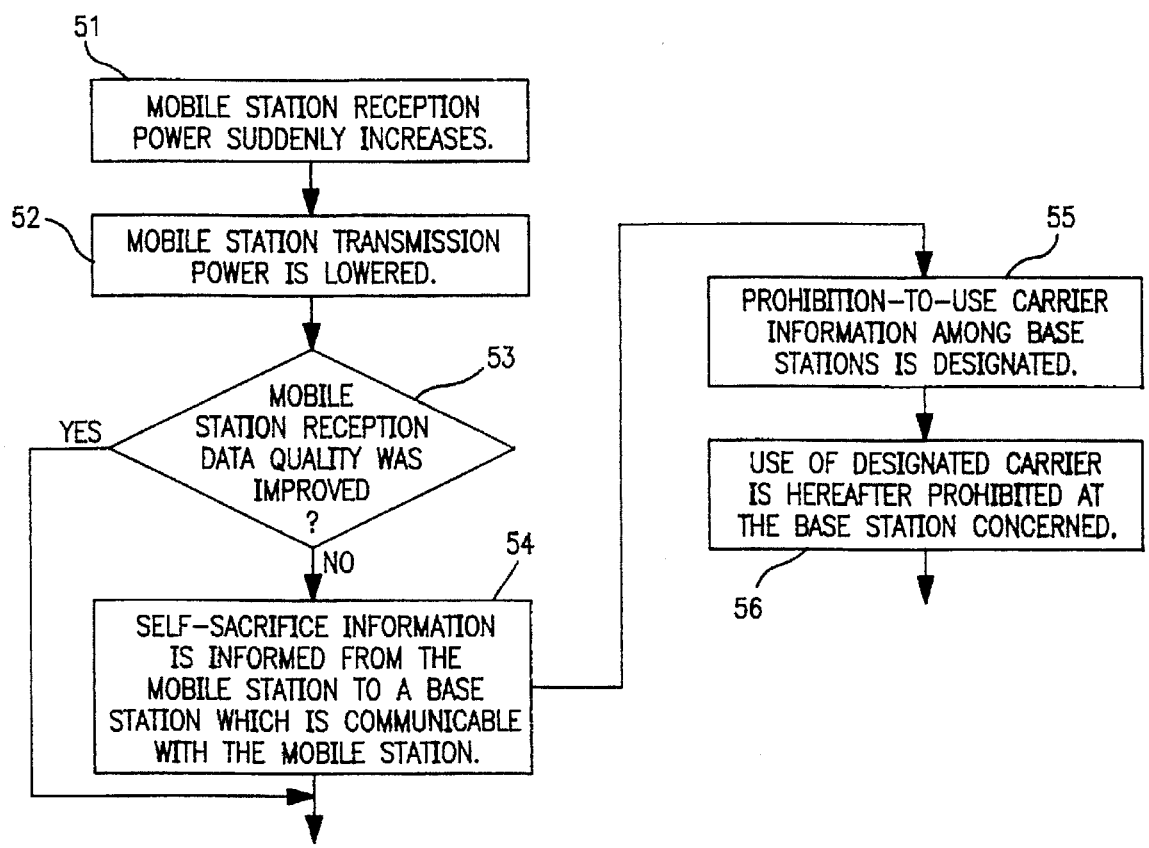
FIG. 5 is a flow chart of the performance of the system in accordance with the second exemplary embodiment of the present invention.

The performance of the CDMA system described above is explained below with reference to the flow chart shown in FIG. 5 and the illustrations of the reception power variation of the mobile station 1 due to shadowing as shown in FIGS. 3a–3d.

The reception power measurement means 9 detects that the reception power of the mobile station 1 has suddenly increased (step 51) and the power level of the mobile station transmission signal 7 is lowered by the power amplification means 6 (step 52).

In the situation shown in FIGS. 3a and 3b, because the power from the base station 2a which the mobile station 1 is currently communicating with does not increase, the quality (for example, bit error rate and frame error rate) of the reception data 12 of the mobile station 1 is not improved.

In the case of FIGS. 3c and 3d, because the power from the base station 2a which mobile station 1 is currently in communication with increases, the quality of the reception data 12 of the mobile station 1 is improved.

Therefore, the quality of the reception data 12 of the mobile station 1 can be monitored at the self-sacrifice information generation means 22A and it can be judged if the mobile station 1 is to enter the self-sacrifice mode or not (step 53). The operation of steps 54, 55 and 56 are similar to steps 44, 45 and 46, respectively and their explanations are omitted.

Thus, in the second exemplary embodiment, it is possible to enhance the stability of the entire system by segregating the carriers according to the self-sacrifice history of the embodiment station.

A CDMA system in accordance with an exemplary embodiment of the present invention can segregate the carriers by using the self-sacrifice history of the mobile station and can prevent communication quality deterioration due to shadowing by transmitting the information that a mobile station sacrificed its own communication quality and by prohibiting or restricting the use of the carrier designated at the concerned base station.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the means and range of equivalence of the claims are therefore intended to be embraced therein.

What is claimed:

1. A code division multiple access communication system comprising:
   a mobile station,
   a base station, and
   mobile communication control equipment;
   wherein a plurality of carriers are allocated for mobile communications, and
   said mobile station includes:
      reception power measurement means for measuring the reception power of said mobile station;
      pilot signal despread means for despreading a pilot signal;
      base station number detection means for detecting the base station number according to the despread pilot signal; and
      self-sacrifice information generation means for generating self-sacrifice information that said mobile station is in a self-sacrifice state according to the detected base station number and the output of said reception power measurement means;
   said base station includes:
      means for generating a pilot signal; and
      self-sacrifice information detection means for detecting the self-sacrifice information transmitted from said mobile station; and
   said mobile communication control equipment includes:
      means for generating information to prohibit or restrict the use of a designated carrier at said base station according to the output of said self-sacrifice information detection means transmitted from said base station.

2. A code division multiple access communication system as recited in claim 1, wherein
   a plurality of base stations are provided, and
   pilot signals transmitted from each base station have the same frequencies and spread codes and different phases.

3. A code division multiple access communication system as recited in claim 1, wherein
   said mobile station further includes:
      power control means for controlling the transmission power according to the reception power received by said reception power measurement means;
      spread means for spreading transmission data and the self-sacrifice information; and
      data signal despread means for despreading a received data signal.

4. A code division multiple access communication system as recited in claim 1, wherein
   said base station further includes:
      despread means for despreading a signal representing the self-sacrifice information transmitted from said mobile station;
      data signal spread means for spreading data to be transmitted to said mobile station;
      adder means for adding the spread data from said data signal spread means and a pilot signal; and
      carrier determination means for determining a carrier to be used at said base station based on the self-sacrifice information to prohibit or restrict the use of a designated carrier received from said mobile communication control equipment.

5. A code division multiple access communication system comprising:
   a mobile station,
   a base station, and
   mobile communication control equipment;
   wherein said mobile station includes:
      base station number detection means for detecting a base station number by despreading a pilot signal spread-transmitted from said base station;
      self-sacrifice information generation means for generating self-sacrifice information indicating that said mobile station is in a self-sacrifice state according to the detected base station number and the reception power; and
      spread means for spreading transmission data and the self-sacrifice information;
   said base station includes:
      self-sacrifice information detection means for detecting the self-sacrifice information from information obtained by despreading a signal from said mobile station; and carrier determination means for determining a carrier to be used at said base station based on the self-sacrifice information to prohibit or restrict the use of a designated carrier output by said mobile communication control equipment; and said mobile communication control equipment includes:
means for generating information to prohibit or restrict the use of a designated carrier at said base station according to the output of said self-sacrifice information detection means transmitted from said base station.

6. A code division multiple access communication system comprising:

a mobile station, a base station, and mobile communication control equipment;

wherein a plurality of carriers are allocated for mobile communications, and said mobile station includes:
reception power measurement means for measuring the reception power; and
self-sacrifice information generation means for generating self-sacrifice information indicating that said mobile station is in a self-sacrifice state according to the quality of the reception data and the output of said reception power measurement means;

said base station includes:
self-sacrifice information detection means for detecting the self-sacrifice information transmitted from said mobile station; and said mobile communication control equipment includes:
means for generating information to prohibit or restrict the use of a designated carrier at said base station according to the output of said self-sacrifice information detection means transmitted from said base station.

7. A code division multiple access communication system as recited in claim 6, wherein:

said mobile station further includes:
power control means for controlling the transmission power according to the reception power measured by said reception power measurement means;
data signal despread means for despreading a received data signal; and
spread means for spreading transmission data and said self-sacrifice information.

8. A code division multiple access communication system as recited in claim 6, wherein said base station further includes:
despread means for despreading a signal representing the self-sacrifice information transmitted from said mobile station;
data signal spread means for spreading data to be transmitted to said mobile station; and
carrier determination means for determining a carrier to be used at said base station based on information to prohibit or restrict the use of a designated carrier received from said mobile communication control equipment.

9. A code division multiple access communication system comprising:

a mobile station, a base station, and mobile communication control equipment; wherein said mobile station includes:
self-sacrifice information generation means for generating self-sacrifice information indicating that said mobile station is in a self-sacrifice state according to a reception data quality and a reception power; and
spread means for spreading transmission data and the self-sacrifice information;

said base station includes:
self-sacrifice information detection means for detecting the self-sacrifice information from information obtained by despreading a signal from said mobile station; and
carrier determination means for determining a carrier to be used at said base station based on the self-sacrifice information to prohibit or restrict the use of a designated carrier output by said mobile communication control equipment; and said mobile communication control equipment includes:
means for generating information to prohibit or restrict the use of a designated carrier at said base station according to the output of said self-sacrifice information detection means transmitted from said base station.

10. A communication method in a code division multiple access communication system comprising:

reducing the power level of a transmission signal of a mobile station, when the reception power at said mobile station suddenly increases;

detecting whether the level of a pilot signal from a base station which said mobile station is now communicating with has increased;

providing self-sacrifice information to said base station, indicating that said mobile station is in a self-sacrifice state, when the level of the pilot signal does not increase;

designating a carrier which said base station is prohibited or restricted from using according to said self-sacrifice information; and prohibiting or restricting a base station from using the designated carrier.

11. A communication method in a code division multiple access communication system comprising:

reducing the power of a transmission signal of a mobile station, when the reception power at said mobile station suddenly increases;

detecting whether the reception data quality of said mobile station has improved;

providing self-sacrifice information to a base station, indicating that said mobile station is in a self-sacrifice state, when the reception data to quality has not improved;

designating a carrier which said base station is prohibited or restricted from using according to said self-sacrifice information; and prohibiting or restricting a base station from using the designated carrier.

* * * * *

UNITED STATES PATENT AND TRADE MARK OFFICE
CERTIFICATE OF CORRECTION

PATENT NO.   : 5,646,937
DATED        : July 8, 1997
INVENTOR(S)  : Nakano et al.

It is certified that error appears in the above-identified patent and that said Letters Patent is hereby corrected as shown below:

Column 10, line 55, between the words "data" and "quality" delete the word "to".

Signed and Sealed this

Sixteenth Day of December, 1997

Attest:

BRUCE LEHMAN

Attesting Officer

Commissioner of Patents and Trademarks